(12) United States Patent
Quarre

(10) Patent No.: US 6,806,595 B2
(45) Date of Patent: Oct. 19, 2004

(54) LOW BACKLASH LINEAR ACTUATOR

(75) Inventor: Steven C. Quarre, Woodinville, WA (US)

(73) Assignee: Applied Precision, LLC, Issaquah, WA (US)

( * ) Notice: Subject to any disclaimer, the term of this patent is extended or adjusted under 35 U.S.C. 154(b) by 0 days.

(21) Appl. No.: 10/323,697

(22) Filed: Dec. 18, 2002

(65) Prior Publication Data

US 2003/0173868 A1 Sep. 18, 2003

Related U.S. Application Data

(60) Provisional application No. 60/343,301, filed on Dec. 19, 2001.

(51) Int. Cl.[7] ............................................... H02K 41/00
(52) U.S. Cl. ............................ 310/12; 310/13; 310/15; 464/75
(58) Field of Search ............................. 310/12, 13, 15, 310/83, 75 A, 75 D, 75 R

(56) References Cited

U.S. PATENT DOCUMENTS

| | | | |
|---|---|---|---|
| 3,658,092 A | | 4/1972 | Walker .................... 137/625.21 |
| 4,577,127 A | | 3/1986 | Ferree .......................... 310/83 |
| 5,040,631 A | * | 8/1991 | Lang et al. ................. 180/446 |
| 5,453,651 A | | 9/1995 | Kroner ........................ 310/209 |
| 5,865,272 A | * | 2/1999 | Wiggins et al. ........... 185/40 R |
| 5,917,259 A | | 6/1999 | Stridsberg ..................... 310/75 |
| 5,925,960 A | | 7/1999 | Hayes ......................... 310/211 |

* cited by examiner

*Primary Examiner*—Darren Schuberg
*Assistant Examiner*—Iraj A. Mohandesi
(74) *Attorney, Agent, or Firm*—Pillsbury Winthrop LLP

(57) ABSTRACT

A high-precision, low backlash linear actuator drive mechanism characterized by minimal positional repeatability error irrespective of the direction from which a selected or target position is approached may comprise a bellows coupling operative to transmit rotational motion from a motor to a drive spindle. Rotation of the drive spindle causes linear translation thereof in an axial direction.

16 Claims, 2 Drawing Sheets

LOW BACKLASH LINEAR ACTUATOR

This application claims the benefit of U.S. provisional application Ser. No. 60/343,301 entitled "LOW BACKLASH LINEAR ACTUATOR," filed Dec. 19, 2001.

FIELD OF THE INVENTION

Aspects of the present invention relate generally to linear actuators, and more particularly to a low backlash linear actuator exhibiting fast response and minimal overshoot.

DESCRIPTION OF THE RELATED ART

Conventional mechanical and electromechanical systems providing linear motion for positioning structural components typically employ actuator mechanisms which require that the moving, or translated, component always approach a desired or target position from the same direction. Such unidirectional approach strategies attempt to optimize accuracy by minimizing positional errors contributed or exacerbated by rotational backlash in the drive mechanism. In this context, the term "backlash" generally refers to inaccuracies (e.g., play, or looseness) in the connections between the drive components which require that a motor drive shaft, a coupling mechanism, or both must rotate through some initial angular displacement before any motion is coupled to the translated component. As is generally known, the unidirectional approach to alleviating backlash often requires that the actuator translate the component linearly beyond a desired target position; the actuator may then be reversed such that the translated component approaches the target position from the "correct" or selected direction. In addition to the foregoing inefficiency, such traditional systems are generally characterized by slow response times and inaccurate control loops.

Some systems attempting to avoid the unidirectional approach strategy utilize a high resolution piezoelectric actuator operably coupled to a feedback loop. In such arrangements, the feedback loop is necessary as a consequence of the significant hysteresis characteristic of piezoelectric actuators. While nominally overcoming some of the efficiency problems associated with approaching the target position from a single direction, disadvantages of such a piezoelectric actuator implementation include, among other things, significantly limited overall travel range (e.g., travel is usually less than about 60 $\mu$m).

SUMMARY

Embodiments of the present invention overcome the above-mentioned and various other shortcomings of conventional implementations, providing a high-precision, low backlash linear actuator exhibiting minimal positional repeatability error regardless of directional approach to the target position.

In accordance with one embodiment, for example, an actuator drive mechanism may employ a bellows coupling operative to transmit rotational motion from a motor to a drive spindle. Rotation of the drive spindle may cause linear translation thereof in an axial direction.

Specifically, in some embodiments, a drive mechanism comprises: a motor; a drive spindle; and a bellows coupling configured and operative to transmit rotational motion from the motor to the drive spindle allowing rotation of the drive spindle about an axis; wherein the rotation of the drive spindle causes the drive spindle to translate in an axial direction.

The bellows coupling may comprise a bellows having a first end operably coupled to the motor and a second end operably coupled to the drive spindle. As set forth in detail below, the first end of the bellows may generally be fixed in an axial position relative to the motor; the second end of the bellows translates with the drive spindle in the axial direction.

In accordance with some embodiments, the drive spindle comprises a threaded section threadably engaged with a cooperating structure fixed in an axial position relative to the motor. The cooperating structure may be incorporated in or fixedly attached to a housing.

The motor generally comprises a rotatable coupling mechanism operative to transmit rotational motion to the bellows; the first end of the bellows generally comprises means for preventing annular slipping of the bellows relative to the rotatable coupling mechanism. Similarly, the second end of the bellows generally comprises means for preventing annular slipping of the drive spindle relative to the bellows. Accordingly, torque may be efficiently transferred to the bellows from the motor, and from the bellows to the drive spindle. In some implementations, the means for preventing annular slipping comprises a set screw; other such means and mechanisms for preventing annular slipping are contemplated.

In accordance with some exemplary embodiments, a linear actuator comprises: a housing; a motor fixedly attached to the housing; a drive spindle; and a bellows coupling configured and operative to transmit rotational motion from the motor to the drive spindle allowing rotation of the drive spindle about an axis; wherein the housing comprises a structural component fixed in an axial position relative to the motor and cooperating with the drive spindle such that the rotation of the drive spindle causes the drive spindle to translate in an axial direction.

As with the implementations of a drive mechanism noted above, the bellows coupling generally comprises a bellows having a first end operably coupled to the motor and a second end operably coupled to the drive spindle. The first end of the bellows is fixed in an axial position relative to the motor. The second end of the bellows translates with the drive spindle in the axial direction.

In the exemplary embodiments, the drive spindle comprises a threaded section threadably engaged with the structural component, which may be embodied in or comprise a threaded nut, for example, or a similar component integrated or associated with the housing.

The motor comprises a rotatable coupling mechanism operative to transmit rotational motion to the bellows; the first end of the bellows comprises means for preventing annular slipping of the bellows relative to the rotatable coupling mechanism. Similarly, the second end of the bellows comprises means for preventing annular slipping of the drive spindle relative to the bellows. As noted above, torque may be efficiently transferred to the bellows from the motor, and from the bellows to the drive spindle. In some implementations, the means for preventing annular slipping comprises a set screw; other such means and mechanisms for preventing annular slipping are contemplated.

The foregoing and other aspects of various embodiments of the present invention will be apparent through examination of the following detailed description thereof in conjunction with the accompanying drawings.

DETAILED DESCRIPTION

In accordance with some embodiments, a high-precision, low backlash linear actuator as set forth herein may be characterized by minimal positional repeatability error irrespective of the direction from which a selected or target position is approached. Such a low backlash linear actuator may have utility in various dynamic applications requiring fast response times with minimal "overshoot" or other positioning inaccuracies. In some embodiments, for example, an exemplary linear actuator or drive mechanism may be employed in conjunction with fiber optic alignment tools utilizing positional feedback systems. Other applications will be readily apparent to those of skill in the art.

Figure 1:
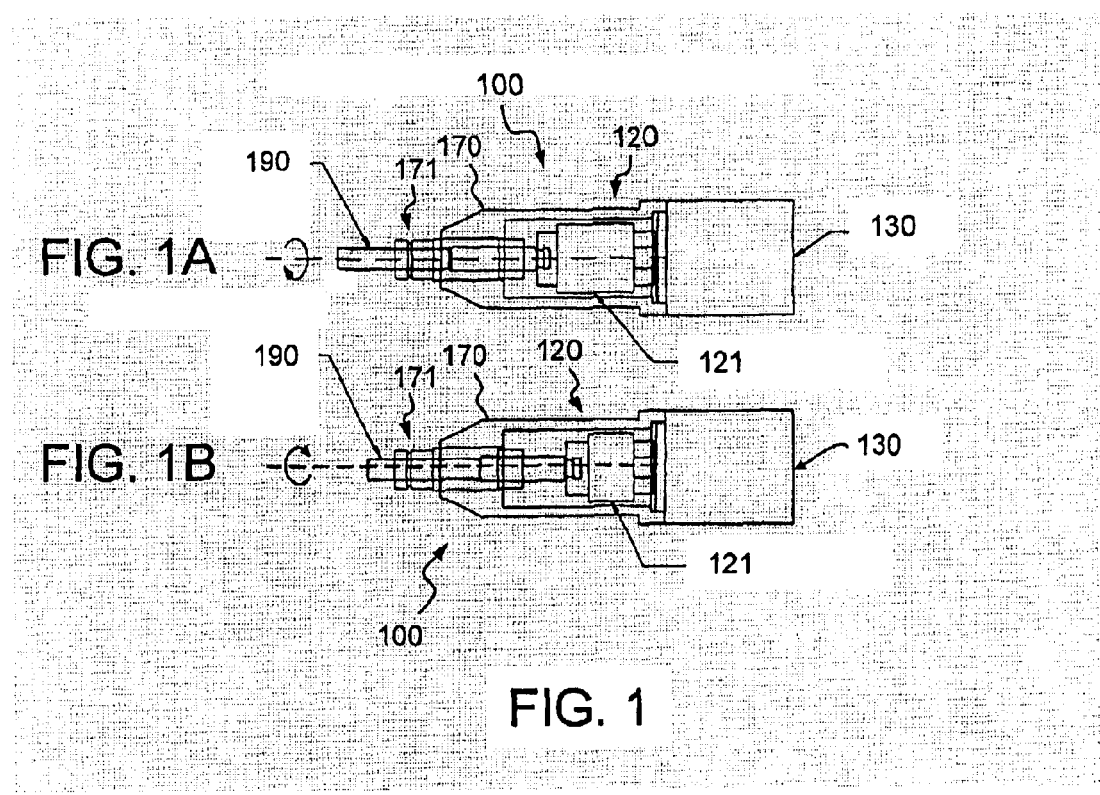
FIG. 1A is a simplified functional block diagram illustrating one embodiment of a low backlash linear actuator with a drive spindle in an extended position.
FIG. 1B is a simplified functional block diagram illustrating one embodiment of a low backlash linear actuator with a drive spindle in a retracted position.

Turning now to the drawing figures, it is noted that FIG. 1A is a simplified functional block diagram illustrating one embodiment of a low backlash linear actuator with a drive spindle in an extended position, and FIG. 1B is a simplified functional block diagram illustrating one embodiment of a low backlash linear actuator with a drive spindle in a retracted position.

An exemplary embodiment of a linear actuator 100 generally comprises a motor 130, a drive spindle 190, and a bellows coupling 120 comprising an expandable bellows 121. Bellows coupling 120 may operably connect motor 130 and spindle 190, transmitting rotational motion imparted by motor 130 to spindle 190 substantially as set forth below.

As indicated in FIGS. 1A and 1B, actuator 100 may further comprise a housing 170 in which the various described components may be mounted, secured, fixedly or movably attached, or otherwise disposed as set forth below. Housing 170 may be fabricated, in whole or in part, of various metals or alloys, plastics, acrylics, or other polymeric materials, ceramics, or some combination thereof. In some implementations, housing 170 may be embodied in a rigid structure comprising a metal such as aluminum, stainless steel, or titanium, for example.

Housing 170 may generally be configured and operative to support motor 130 in a fixed position relative to other components of actuator 100 and to support both bellows coupling 120 and drive spindle 190 in such a manner as to allow rotation thereof relative to housing 170 and motor 130. Accordingly, it will be appreciated that housing 170 may define one or more cavities or bores suitably configured and dimensioned to allow the interoperability, and to support the functionality, set forth in detail below. In that regard, housing 170 may generally comprise a spindle nut 171 through which drive spindle 190 may extend into housing 170 for coupling with bellows coupling 120. Various configurations, dimensional characteristics, and component arrangements for housing 170 will be readily apparent to those of ordinary skill in the art; the present disclosure is not intended to be limited to any specific embodiments, materials, structural features, or fabrication techniques employed with respect to housing 170.

By way of background, it is noted that bellows couplings have traditionally been used to produce rotary motion, for example, with respect to ball screws, worm gears, servo drive systems, or other rotatable mechanisms. Bellows couplings typically exhibit suitable torsional stiffness to transmit torque efficiently, but the nature of the bellows design renders such couplings pliant or "soft" in the axial direction, a characteristic typically considered a drawback in linear actuator systems. Accordingly, conventional designs do not employ bellows couplings for imparting or transmitting linear or axial motion. Specifically, in conventional applications, the ends of a bellows coupling are typically fixed relative to each other such that axial expansion and contraction of the bellows are not permitted; as a consequence, the coupling can neither cause nor allow the spindle to translate in the axial direction. In the exemplary embodiment of FIGS. 1A–B and 2, however, bellows 121 employed in coupling 120 may be operative not only selectively to cause rotary motion of spindle 190, but also to enable controlled linear motion of spindle 190 in the axial direction.

Figure 2:
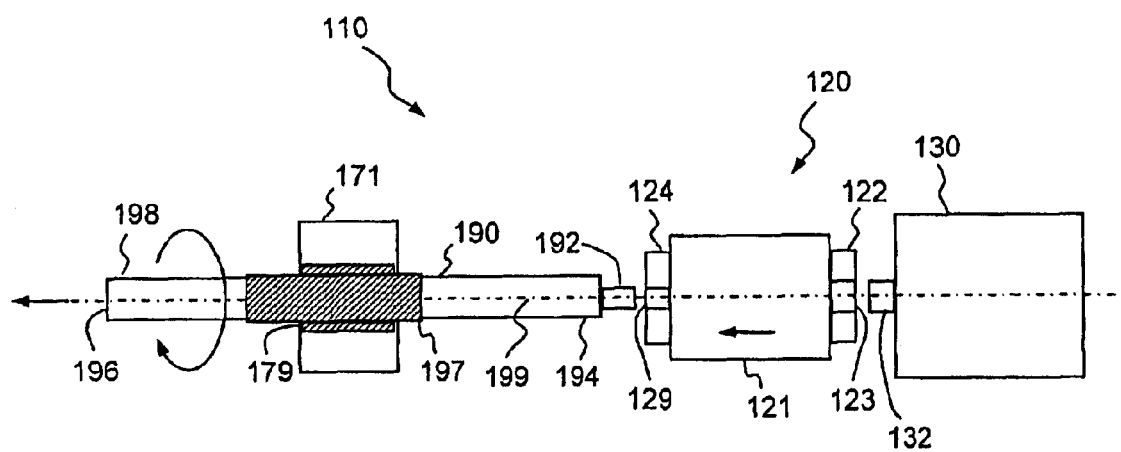
FIG. 2 is a simplified, partially exploded block diagram illustrating one embodiment of a low backlash linear actuator drive mechanism employing a bellows coupling.

FIG. 2 is a simplified, partially exploded block diagram illustrating one embodiment of a low backlash linear actuator drive mechanism employing a bellows coupling. Actuator drive mechanism 110 may have utility in embodiments of actuator 100 described above with reference to FIGS. 1A and 1B, and may incorporate the components and functionality set forth above. Specifically, actuator drive mechanism 110 generally comprises a motor 130, a drive spindle 190, and a bellows coupling 120 as described above.

As indicated in FIG. 2, bellows coupling 120 comprises a bellows 121 having a first end (motor hub 122) operably coupled to motor 130 and a second end (spindle hub 124) operably coupled to drive spindle 190. In that regard, motor hub 122 generally comprises a motor coupling 123 operative to engage a cooperating structure or coupling mechanism associated with motor 130, and spindle hub 124 generally comprises a spindle coupling 129 operative to engage a cooperating structure or coupling mechanism associated with drive spindle 190.

Bellows 121 may comprise or be fabricated of, in whole or in part, any of various metals, alloys, or other suitable materials generally known to have utility in bellows coupling design such as, for example, stainless steel, aluminum, nickel, copper, titanium, and so forth. The foregoing list is not intended to be inclusive. Bellows 121 may be manufactured to have a selected or predetermined number of convolutions suitable to a particular application; it will be appreciated, therefore, that the number of convolutions may be a function of, for example, axial stroke requirements, maximum torque, materials selection, expected operating temperatures or other environmental considerations, and other factors. Similarly, hubs 122, 124 and couplings 123, 129 may also comprise or be constructed of various metals or alloys including, but not limited to, those listed above.

Numerous and varied materials, configurations, and fabrication techniques are generally known to be suitable or appropriate for bellows coupling construction. The present disclosure is not intended to be limited to any specific constitution of bellows coupling 120 or component parts. In that regard, coupling 120 may be embodied in or comprise any type of bellows coupling technology or any other expandable coupling mechanism configured and operative in accordance with known principles.

Motor 130 may be embodied in or comprise a stepper motor, for example, or any other type of electric or electromagnetic motor, such as a direct current (DC) brush motor or a servomotor, for instance. Such motors are typically characterized by, or rated in accordance with, various parameters such as voltage and current values, maximum rotation speed and the controllability thereof, maximum produced torque or holding torque, angular resolution or positioning control, and so forth. Particular operational characteristics of motor 130 may be selected or configured in accordance with the specific application or functional requirements of the device in which actuator drive mechanism 110 is employed. In some embodiments requiring high angular resolution (i.e., precise positioning) and speed control, motor 130 may be embodied in an appropriate stepper motor selected or constructed to satisfy various system specifications.

Motor 130 may generally comprise a rotatable motor hub coupling 132 operative to transmit torque and rotational motion to bellows 121 through motor coupling 123. In the exemplary FIG. 2 embodiment, motor hub coupling 132 is illustrated as a drive shaft extending into or otherwise engaging a socket or other cooperating structure at motor coupling 123. In this embodiment, the drive shaft may have an axial cross section of any suitable shape or dimensional characteristics, i.e., the shaft may be circular, rectangular, square, or some other polygonal shape in axial cross section. Additionally, motor hub 122 may comprise one or more set screws, clamps, flanges, or collars, for example, or other locking mechanisms (not shown) operative to prevent axial disengagement and annular slippage of the drive shaft with respect to motor coupling 123.

It will be appreciated that other structures or mechanisms are contemplated for coupling motor 130 and motor hub 122. By way of example, the illustrated male/female structural arrangement may be reversed, for instance, such that motor hub 122 or motor coupling 123 comprises a shaft, an array or series of pins, or some other protuberance, while motor hub coupling 132 comprises one or more slots, sockets, or other receptacles.

In any of the foregoing embodiments, a structural component of motor coupling 123 may operably engage a cooperating structural component of motor hub coupling 132; as noted above, the structural connection or engagement may prevent both axial movement as well as annular slipping of motor coupling 123 (and therefore, motor hub 122) relative to motor hub coupling 132. Accordingly, since motor 130 may be fixedly or rigidly attached to housing 170 as described above with reference to FIGS. 1A and 1B, motor hub 122 may generally be fixed in a particular axial position, i.e., axially fixed relative to motor 130.

Preventing annular slippage between motor hub coupling 132 and motor coupling 123 enables motor 130 to rotate motor hub 122 and bellows 121 with a selected or desired angular resolution and minimal error. In embodiments employing motor 130 characterized as a high angular resolution stepper motor, for instance, very precise angular positioning of motor hub 122 and bellows 121 may be achieved through rigid coupling of motor 130 and bellows coupling 120 as set forth above.

As with the mechanical connection between motor 130 and motor hub 122, a structural component of spindle coupling 129 (at spindle hub 124) may operably engage a cooperating structural component of spindle hub coupling 192. The engagement or structural connection may prevent both axial and annular movement or slippage of drive spindle 190 relative to spindle hub 124. In the exemplary FIG. 2 embodiment, spindle hub coupling 192 is illustrated as a shaft or protuberance extending into or otherwise engaging a socket or other cooperating structure at spindle coupling 129. In this embodiment, the shaft may have, for example, a circular, rectangular, square, or other polygonal axial cross section.

As set forth above with reference to motor 130 and motor hub 122, alternative structures or mechanisms, and the addition of locking mechanisms or other components, are contemplated for coupling drive spindle 190 and spindle hub 124. In applications requiring precise positioning control, for example, prevention of annular slippage of drive spindle 190 relative to spindle coupling 129 and spindle hub 124 may minimize errors; in that regard, spindle hub 124 may comprise one or more set screws, collars, or other locking mechanisms operative to fix spindle hub coupling 192 and to prevent movement or slipping relative to spindle coupling 129.

Drive spindle 190 generally comprises a proximal end 194 at which spindle hub coupling 192 is disposed and a distal end 198 (or spindle "tip") comprising a surface 196, the position of which is controlled in linear actuator applications. In use, surface 196 may abut, contact, or otherwise bear on a component to be moved; in particular, surface 196 may be rigidly, fixedly, rotatably, or otherwise connected, coupled, or attached to a component to be moved, for example. In applications requiring precise movements or placements, surface 196 or another portion of distal end 198 may be rigidly or fixedly attached to the component to be moved, minimizing errors due to play or "give" in the connection. It is noted that drive spindle 190 rotates about a longitudinal axis 199 during operation, however, and a fixed connection with a component to be moved may be undesirable in some applications; accordingly, surface 196 may be rotatably attached or coupled to the component to be moved, such as with journal and bearing components, for example.

As noted briefly above, in some alternative implementations, a component to be moved by actuator drive mechanism 110 may be attached or operably coupled to drive spindle 190 at a selected or predetermined location at distal end 198 other than at surface 196. Additionally or alternatively, drive spindle 190 may be removably attached or coupled to the component to be moved, enabling actuator drive mechanism 110 to be employed in various applications. Numerous and varied methods of coupling spindle 190 to a component are known in the art.

Rotational motion (i.e., torque) transmitted to spindle hub coupling 192 from spindle coupling 129 causes drive spindle 190 to rotate about longitudinal axis 199. It will be appreciated that the angular position and degree of rotation of drive spindle 190 may be affected or influenced by numerous factors including, but not limited to: the angular resolution of motor 130 and the precise control thereof; the torsional stiffness of bellows 121; the annular rigidity of the various couplings, for example, between motor 130 and motor hub 122 and between spindle hub 124 and drive spindle 190; and the torque transmitted to drive spindle 190 as well as the torsional stiffness thereof. The various components and structural connections employed in actuator drive mechanism 110 may be selected or configured to provide desired control of drive spindle 190 rotation in light of the foregoing and other considerations.

As indicated in FIG. 2, drive spindle 190 also comprises a threaded section 197 intermediate proximal end 194 and distal end 198. Threaded section 197 may be operative in cooperation with corresponding threads 179 on spindle nut 171 to enable axial motion of drive spindle 190. As noted above, spindle nut 171 may be rigidly or fixedly attached to, or otherwise incorporated or integrated into the structure of, housing 170 (not shown in FIG. 2). Specifically, spindle nut 171 is fixed in a particular axial location relative to housing 170 and motor 130.

In that regard, it is noted that drive spindle 190 may be threadably engaged with any cooperating structure that is fixed in the axial direction; the FIG. 2 embodiment employing spindle nut 171 is illustrated and described by way of example only, and not by way of limitation. The threaded engagement of spindle nut 171 and drive spindle 190, in conjunction with the fixed axial positioning of spindle nut 171 and the rotation of drive spindle 190, enables or allows linear movement of drive spindle 190 as a function of angular displacement thereof.

In particular, as drive spindle 190 rotates, threads 179 engage threaded section 197 and exert an axial force on drive spindle 190, causing linear translation. The degree to which linear translation occurs may be influenced or controlled by various factors including, but not limited to, the number and pitch of threads 179, the axial length of threaded section 197, the elasticity or expandability of bellows 121, and so forth. For example, varying the pitch of threads 179 may enable precise control or predictability of the linear distance drive spindle 190 is translated per revolution (or a selected portion thereof) about axis 199. Overall travel of drive spindle 190 may be limited by the axial length of threaded section 197, for example, or by the maximum axial stroke of bellows 121, either in compression or under tension.

In that regard, it will be appreciated that as drive spindle 190 translates relative to motor 130, bellows 121 may expand or contract, depending upon, for example, the direction of rotation of drive spindle 190 and the orientation of threads 179 and threaded section 197. Specifically, spindle hub 124 translates in the axial direction with spindle 190, expanding or contracting bellows 121 accordingly. In the FIG. 2 illustration, the rotation of drive spindle 190 is depicted as causing linear translation to the left in the drawing figure, expanding bellows 121 as indicated by the arrow. The pliancy or low axial stiffness of bellows coupling 120 enables such linear translation while simultaneously providing desired torsional stiffness for torque transmission.

Torsional stiffness of bellows coupling 120 facilitates precise angular control, minimizing positional errors with respect to distal end 198 of spindle 190. The combination of low axial force and high torsional stiffness provided by bellows coupling 120, in general, and bellows 121, in particular, may result in an actuator drive mechanism 110 exhibiting low mechanical backlash.

It is noted that axial force generated as a function of compression or tension of bellows 121 may generally affect the preload on, and thus the position of, drive spindle 190; those of skill in the art will appreciate that maximum preload values, whether compressive or tensile, will generally be experienced when bellows 121 is approaching the respective extreme of its axial stroke. If changes in axial force exerted by bellows 121 during expansion and contraction are significant, then precise position of drive spindle 190 may be affected, which in turn may lead to positional accuracy errors with respect to distal end 198. Accordingly, an embodiment of bellows coupling 120 characterized by low axial stiffness over the expected stroke range may be implemented for a high accuracy mechanism.

Figure 3:
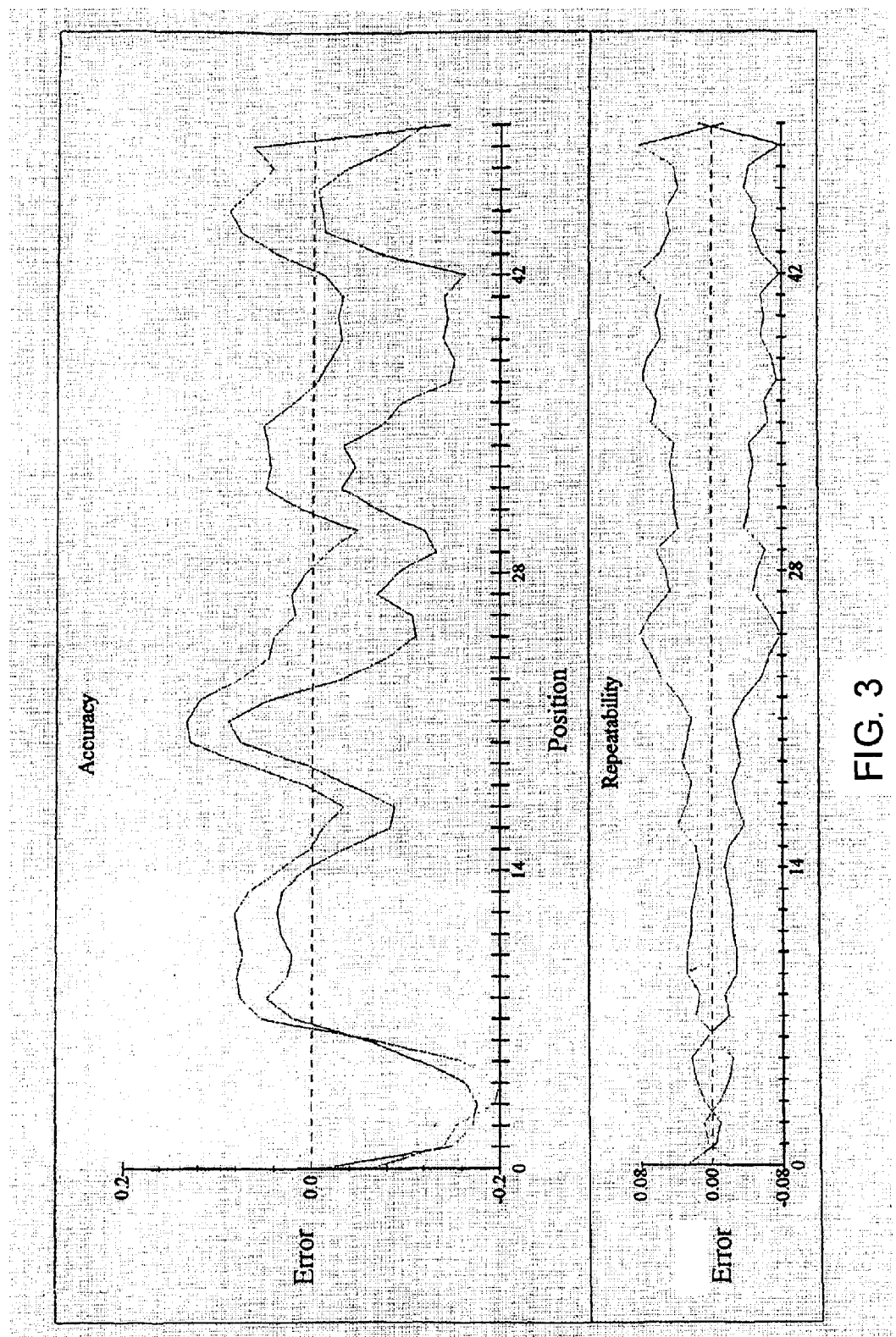
FIG. 3 is a graph illustrating data representative of operational characteristics of one embodiment of low backlash linear actuator.

FIG. 3 is a graph illustrating data representative of operational characteristics of one embodiment of low backlash linear actuator. To acquire the FIG. 3 data, the following parameters were employed: the total move distance (i.e., distance traveled by the distal end of the spindle) was 0.50 mm, which represents approximately one spindle revolution; a total of fifty equally spaced points along the move distance were measured twice, initially with the spindle advancing, and subsequently with the spindle retracting; and the load on the spindle was 1.0 kg. The position of the spindle tip was measured using a laser interferometer coupled to a translation stage against which force from the actuator applied.

The data at the top of FIG. 3 show positional error from the nominal position over one revolution of the spindle. In this case, the maximum accuracy error was approximately 0.30 microns ($\mu$m). It is noted that while the graph indicates a range of ±0.20 $\mu$m on the ordinate axis, the actual magnitude of a single error trace is limited to about 0.30 $\mu$m total; in that regard, it will be appreciated that one error trace is all that is required to define accuracy, while the difference between two error traces may be used to define repeatability.

The data at the bottom of FIG. 3 show the error of the same target position when approached from opposite directions (i.e., first while the spindle is advancing, and then when the spindle is retracting). Specifically, the data at the bottom of FIG. 3 represent backlash error; examination of the plot indicates that backlash error may be limited to about ±0.08 $\mu$m. Other coupling designs operative in accordance with the parameters set forth above typically exhibit backlash errors as great as ±1.0 $\mu$m (i.e., an order of magnitude larger).

The present invention has been illustrated and described in detail with reference to particular embodiments by way of example only, and not by way of limitation. Those of skill in the art will appreciate that various modifications to the exemplary embodiments are within the scope and contemplation of the present disclosure. Accordingly, it is intended that the present invention be limited only by the scope of the appended claims.

What is claimed is:

1. A linear actuator comprising:
   a housing;
   a motor fixedly attached to said housing;
   a drive spindle; and
   a bellows coupling configured and operative to transmit rotational motion from said motor to said drive spindle allowing rotation of said drive spindle about an axis;
   wherein said housing comprises a structural component fixed in an axial position relative to said motor and cooperating with said drive spindle such that said rotation of said drive spindle causes said drive spindle to translate in an axial direction.

2. The linear actuator of claim 1 wherein said bellows coupling comprises a bellows having a first end operably coupled to said motor and a second end operably coupled to said drive spindle.

3. The linear actuator of claim 2 wherein said first end of said bellows is fixed in an axial position relative to said motor.

4. The linear actuator of claim 2 wherein said second end of said bellows translates with said drive spindle in said axial direction.

5. The linear actuator of claim 2 wherein said motor comprises a rotatable coupling mechanism operative to transmit rotational motion to said bellows and wherein said first end of said bellows comprises means for preventing annular slipping of said bellows relative to said rotatable coupling mechanism.

6. The drive mechanism of claim 5 wherein said means for preventing annular slipping comprises a set screw.

7. The drive mechanism of claim 2 wherein said second end of said bellows comprises means for preventing annular slipping of said drive spindle relative to said bellows.

8. The drive mechanism of claim 7 wherein said means for preventing annular slipping comprises a set screw.

9. The linear actuator of claim 1 wherein said drive spindle comprises a threaded section threadably engaged with said structural component.

10. The linear actuator of claim 9 wherein said structural component is a threaded nut.

11. A drive mechanism comprising:

a motor;

a drive spindle; said drive spindle comprising a threaded section;

a cooperating structure fixed in an axial position relative to said motor and threadably engaging said threaded section; and a bellows coupling configured and operative to transmit rotational motion from said motor to said drive spindle allowing rotation of said drive spindle about an axis; said bellows coupling comprising a bellows having a first end operably coupled to, and fixed in an axial position relative to, said motor and a second end operably coupled to said drive spindle;

wherein said threaded section and said cooperating structure allow said rotation of said drive spindle to translate said drive spindle in an axial direction.

12. The drive mechanism of claim 11 wherein said second end of said bellows translates with said drive spindle in said axial direction.

13. The drive mechanism of claim 11 wherein said motor comprises a rotatable coupling mechanism operative to transmit rotational motion to said bellows and wherein said first end of said bellows comprises means for preventing annular slipping of said bellows relative to said rotatable coupling mechanism.

14. The drive mechanism of claim 13 wherein said means for preventing annular slipping comprises a set screw.

15. The drive mechanism of claim 11 wherein said second end of said bellows comprises means for preventing annular slipping of said drive spindle relative to said bellows.

16. The drive mechanism of claim 15 wherein said means for preventing annular slipping comprises a set screw.

* * * * *